United States Patent
Lee

(10) Patent No.: US 7,216,259 B2
(45) Date of Patent: May 8, 2007

(54) INCREMENT POWER SAVING IN BATTERY POWERED WIRELESS SYSTEM WITH SOFTWARE CONFIGURATION

(75) Inventor: Byung Taek Lee, San Diego, CA (US)

(73) Assignee: Via Telecom Co., Ltd., San Diego, CA (US)

( * ) Notice: Subject to any disclaimer, the term of this patent is extended or adjusted under 35 U.S.C. 154(b) by 544 days.

(21) Appl. No.: 10/833,364

(22) Filed: Apr. 28, 2004

(65) Prior Publication Data
US 2005/0257088 A1 Nov. 17, 2005

(51) Int. Cl.
G06F 11/00 (2006.01)
G06F 11/36 (2006.01)

(52) U.S. Cl. ............................ 714/38; 714/731; 714/35
(58) Field of Classification Search .................. 714/32
See application file for complete search history.

(56) References Cited

U.S. PATENT DOCUMENTS

| 5,058,203 | A |   | 10/1991 | Inagami ........................ 455/89 |
| 5,640,509 | A | * | 6/1997 | Balmer et al. ................. 714/42 |
| 5,930,470 | A | * | 7/1999 | Noguchi et al. ............... 714/38 |
| 6,145,100 | A | * | 11/2000 | Madduri ........................ 714/45 |
| 6,321,329 | B1 | * | 11/2001 | Jaggar et al. ................. 712/227 |
| 6,557,120 | B1 | * | 4/2003 | Nicholson et al. ............ 714/38 |
| 6,634,002 | B1 | * | 10/2003 | Furubeppu et al. ........... 714/42 |
| 6,687,857 | B1 | * | 2/2004 | Iwata et al. ................... 714/38 |
| 6,728,890 | B1 | * | 4/2004 | Mirov et al. ................. 713/300 |
| 7,080,267 | B2 | * | 7/2006 | Gary et al. ................... 713/300 |
| 7,134,062 | B2 | * | 11/2006 | Yan ............................ 714/731 |
| 2002/0116081 | A1 |   | 8/2002 | Wood et al. .................. 700/87 |

FOREIGN PATENT DOCUMENTS

JP      9246439      3/2001

OTHER PUBLICATIONS

English Translation of Foreign Abstract, "CDMA/GSM Handset Online Functional Test", published in "Electronic Technique", 3rd publication of 2004.

* cited by examiner

Primary Examiner—Scott Baderman
Assistant Examiner—Joseph Schell
(74) Attorney, Agent, or Firm—Christopher P. Maiorana, PC

(57) ABSTRACT

A method for conserving power in an apparatus is disclosed. The method generally includes the steps of (A) disabling a subset of a plurality of debug operations using a clock signal at a first frequency while in a normal mode, (B) performing a plurality of debug operations using the clock signal at a second frequency while in a debug mode, wherein the first frequency is slower than the second frequency to conserve power, and (C) adjusting the clock signal to one of the first frequency and the second frequency in response to receiving a command generated external to the apparatus to transition to a respective one of the normal mode and the debug mode.

20 Claims, 4 Drawing Sheets

132 ⬎

```
VOID ENABLE_DEBUGGING()
{
  DEBUG_ENABLED = TRUE;

/* CHANGE CPU CLOCK SOURCE */
  PLL_REGISTER = HIGH_CLOCK;
}

VOID DISABLE_DEBUGGING()
{
  DEBUG_ENABLED = FALSE;

/* CHANGE CPU CLOCK SOURCE */
  PLL_REGISTER = LOW_CLOCK;
}
```

126a ～ 
```
VOID HANDOFF_MODULE(,,,)
{
  INT A, B, C;
  A=10;
  B=A*10;

/*FOR DEBUGGING PURPOSE */
  DEBUG_FUNCTION(A, B);
}
```

128a ～ `VOID DEBUG_FUNCTION(,,,)`
    `{`
134 ～ `IF (DEBUG_ENABLED==TRUE)`
        `{`
160 ～ `CNTRL=HIGH;`
162 ～ `DEBUG ACTIVITIES`
            `SEND DEBUGGING INFORMATION TO PC`
        `}`
164 ～ `ELSE`
165 ～ `CNTRL=LOW;`
    `}`
    `...`

(PART OF MOBILE PHONE SOFTWARE)

FIG. 2

INCREMENT POWER SAVING IN BATTERY POWERED WIRELESS SYSTEM WITH SOFTWARE CONFIGURATION

FIELD OF THE INVENTION

The present invention relates to a method and/or architecture for controlling a clock speed generally and, more particularly, to an increment power saving in battery powered wireless systems with software configuration.

BACKGROUND OF THE INVENTION

Power consumption is an important issue in conventional microprocessor-based embedded systems such as mobile telephone and personal digital assistant (PDA) products. Because of hardware and software complexity in such systems, a significant amount of power is consumed by a debugging capability built into the product. The debugging capability is useful for development and troubleshooting purposes by the manufacturer. However, the debugging capabilities are not used by the end consumer. Therefore, the conventional systems waste power performing background debugging operations that are of no interest to the consumer.

SUMMARY OF THE INVENTION

The present invention concerns a method for conserving power in an apparatus. The method generally comprises the steps of (A) disabling a subset of a plurality of debug operations using a clock signal at a first frequency while in a normal mode, (B) performing the debug operations using the clock signal at a second frequency while in a debug mode, wherein the first frequency is slower than the second frequency to conserve power, and (C) adjusting the clock signal to one of the first frequency and the second frequency in response to receiving a command generated external to the apparatus to transition to a respective one of the normal mode and the debug mode.

The objects, features and advantages of the present invention include providing a method and/or architecture for saving power in battery powered wireless systems with software configurability that may (i) lower power consumption during normal operations as compared with development operations, (ii) configure a clock source differently during different modes of operation and/or (iii) extend battery life when used by a consumer.

BRIEF DESCRIPTION OF THE DRAWINGS

These and other objects, features and advantages of the present invention will be apparent from the following detailed description and the appended claims and drawings in which:

FIG. 2 is a listing of a portion of an example pseudo code implementing a debug software routine embedded in a normal software routine;

DETAILED DESCRIPTION OF THE PREFERRED EMBODIMENTS

Figure 1:
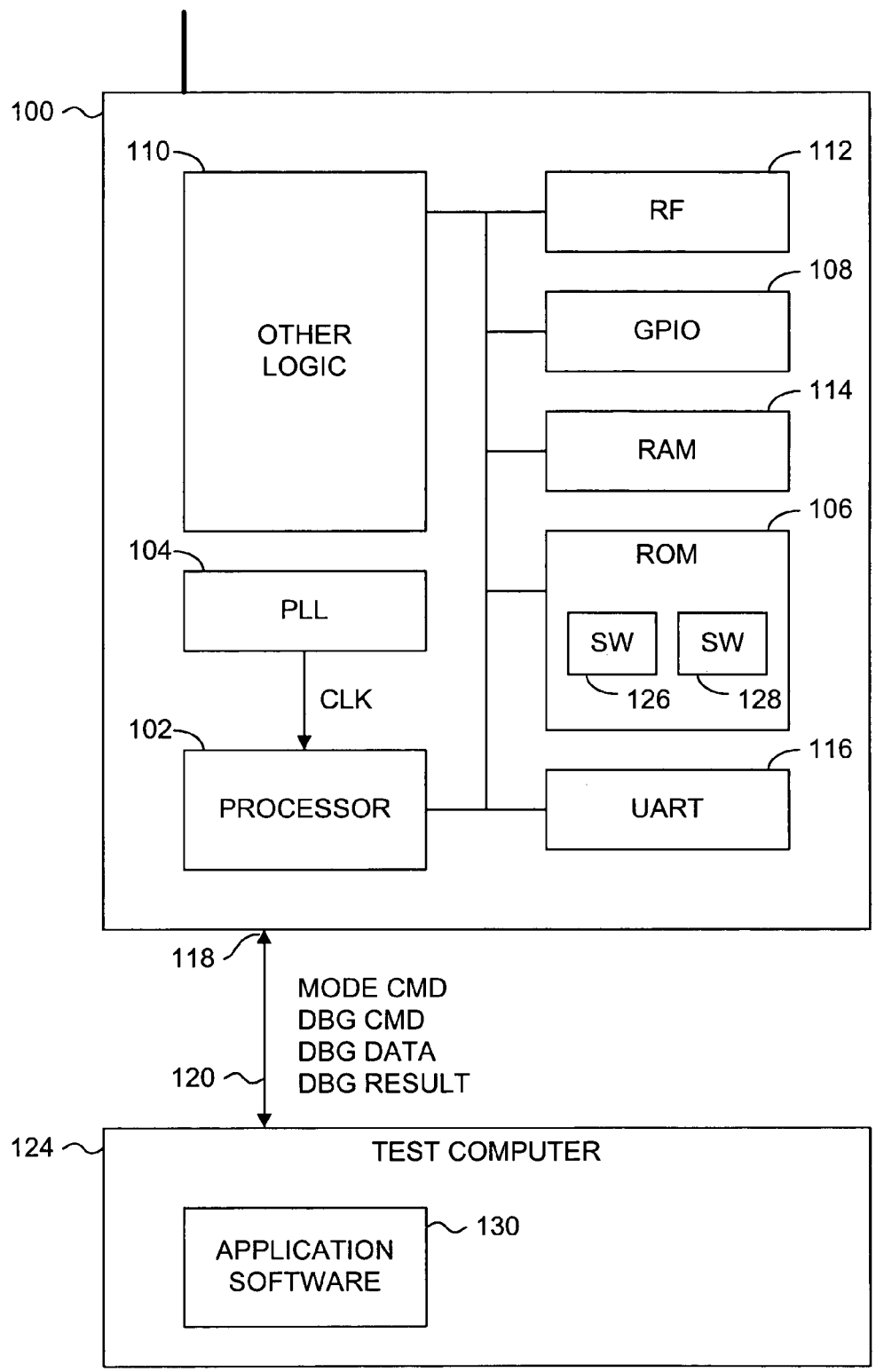
FIG. 1 is a block diagram of an example implementation for an apparatus in accordance with a preferred embodiment of the present invention.

Referring to FIG. 1, a block diagram of an example implementation for an apparatus (or system) 100 is shown in accordance with a preferred embodiment of the present invention. The apparatus 100 may be implemented as a mobile telephone, personal digital assistant or other battery powered portable device having a software configuration capability. By way of example, the apparatus 100 may be described in terms of a mobile telephone implementation. The mobile telephone apparatus 100 generally comprises a circuit (or block) 102, a circuit (or block) 104, a circuit (or block) 106, a circuit (or block) 108, a circuit (or block) 110, a circuit (or block) 112, a circuit (or block) 114 and a circuit (or block) 116. The apparatus 100 may have an interface 118 coupleable to a bus 120. The bus 120 may be connected to a computer 124 external to the mobile telephone apparatus 100. A signal (e.g., MODE CMD) may be generated by the computer 124 and received at the interface 118. A signal (e.g., CLK) may be generated by the circuit 104.

The circuit 102 may be referred to as a processor circuit. The processor circuit 102 may be implemented as a digital processor. The processor circuit 102 may be configured to perform ten to hundreds of millions of instructions per second (MIPS). For example, the processor circuit 102 may operate in a range from approximately 56 MIPS to 132 MIPS, depending on a clocking speed. The clocking speed may vary in a range from approximately 40 megahertz (MHz) to approximately 132 MHz. Other processor throughputs and clocking speeds may be implemented to meet the criteria of a particular application. In one embodiment, the processor circuit 102 may be coupled to the interface 118 to communicate on the bus 120.

The circuit 104 may be referred to as a clock circuit. The clock circuit 104 may be implemented as a phase lock loop (PLL) circuit. The clock circuit 104 may generate the signal CLK at multiple frequencies, one frequency at time. The signal CLK may be referred to as a clock signal. The clock signal CLK may drive the processor circuit 102. The clock signal CLK may also drive one or more of the circuits 106, 108, 110, 112, 114 and/or 116.

The circuit 106 may be referred to as a memory circuit. The memory circuit 106 may be implemented as a read-only memory (ROM) circuit. The ROM circuit 106 may be operational as a nonvolatile type memory to store software programs while the mobile telephone apparatus 100 is without electrical power. Other types of memory circuits such as FLASH memory, battery-backed random access memory and the like, may be implemented to meet the criteria of a particular application. A set of software routines 126 may be stored in the ROM circuit 106. Another set of software routines 128 may be stored in the ROM circuit 106. The processor circuit 102 may be in communication with the ROM circuit 106 to read the software routines 126 and the software routines 128.

The circuit 108 may be referred to as a general purpose input/output (GPIO) circuit. The GPIO circuit 108 may be operational to provide general input and/or output functions for the mobile telephone apparatus 100. The GPIO circuit 108 may be in communication with the processor circuit, 102 to send and receive data. In one embodiment, the GPIO circuit 108 may be coupled to the interface 118 to communicate with the computer 124 via the bus 120.

The circuit 110 may be referred to as a logic circuit. The logic circuit 110 may be operational to perform various non-software based logical functions. The logic circuit 110 may include high-speed functions supporting code division multiple access (CDMA) operations, time division multiple access (TDMA) operations, global system for mobile communications (GSM) operations, codec operations, built-in test operations, analog-to-digital conversions, digital-to-analog conversions, audio sampling operations, audio drivers, display drivers, indicator drivers, and the like.

The circuit 112 may be referred to as a radio-frequency (RF) circuit. The RF circuit 112 may be operational as a transceiver to allow the mobile telephone apparatus 100 to communicate with other telephone circuitry (not shown). The RF circuit 112 may be configured to communicate in CDMA, time division multiple access or frequency division multiple access environments.

The circuit 114 may be referred to as a memory circuit. The memory circuit 114 may be implemented as a random access memory (RAM) circuit. The RAM circuit 114 may be accessible by the processor circuit 102 to read and write data.

The circuit 116 may be referred to as a universal asynchronous receiver/transmitter (UART) circuit. The UART circuit 116 may be operational to provide a general asynchronous communication capability to the mobile telephone apparatus 100. The UART circuit 116 may be in communication with the processor circuit 102 to send and receive data.

The bus 120 may be referred to as a test bus. The test bus 120 may be operational to provide bidirectional communication between the mobile telephone apparatus 100 and the computer 124. The test bus 120 may be implemented as either a serial bus or a parallel bus. For example, the test bus 120 may be implemented as a USB bus, a Firewire bus or an RS-232 bus. Other bus standards may be implemented to meet the criteria of a particular implementation.

The computer 124 may be referred to as a test computer. The test computer 124 may be implemented as a personal computer (PC), workstation or similar machine. The test computer 124 may be connected to the mobile telephone apparatus 100 in one or more of a development, debugging and/or manufacturing environments. The test computer 124 is generally disconnected from the mobile telephone apparatus 100 upon delivery to a user. The test computer 124 may include an application software 130 to communicate with the mobile telephone apparatus 100.

The software routines 126 may be referred to as normal software routines. The normal software routines may be written to perform CDMA routines to enable the mobile telephone apparatus 100 to communicate with similar devices. The normal software routines may include programs for other functionality used by the apparatus 100 to meet the design criteria of a particular application.

The software routines 128 may be referred to as debug software routines. The debug software routines 128 may be written to perform debugging operations within the mobile telephone apparatus 100. The debug software routines 128 and the normal software routines 126 may be arranged as separate blocks of software and/or intermixed down to a line-by-line of code basis. For example, the debug software routines 128 may be embedded within the normal software routines 126.

The mobile telephone apparatus 100 is generally configured, developed, tested and debugged through the application software 130 running on the test computer 124 via the test bus 120. The application software 130 may send commands (e.g., DBG CMD and MODE CMD) and data (e.g., DBG DATA) to the mobile telephone apparatus 100. Result data (e.g., DBG RESULT) generated by the debug operations may be transferred from the mobile telephone apparatus 100 back to the test computer 124 and the application software 130.

The signal MODE CMD may be referred to as a mode command signal. The signal MODE CMD may convey information to transition the mobile telephone apparatus 100 between a normal (or release) mode and a debug mode. While in the normal mode, the signal CLK may be generated at a first frequency. While in the debug mode, the signal CLK may be generated at a second frequency, higher than the first frequency. For example, the first frequency may be approximately 45 MHz and the second frequency may be approximately 60 MHz. An increase of the second frequency above the first frequency may be determined empirically based on the criteria of a particular application.

The signal DBG CMD may refer to one or more debug commands. The signal DBG DATA may refer to one or more sets of data associated with the debug commands. The signals DBG CMD and DBG DATA may be used to configure, test and/or debug the mobile telephone apparatus 100. The signal DBG RESULT may refer to one or more sets of data resulting from the debug operations performed in the mobile telephone apparatus 100.

The software in the mobile telephone apparatus 100 generally has functionality to support the configuration, testing and debugging capabilities. The software programs running on the mobile telephone apparatus 100 generally comprise (i) a phone functionality within the normal software routines 126 for a user (not shown) and (ii) a debugging functionality within the debug software routines 128 for a developer (not shown) to identify and isolate problems caused by a malfunctions and/or design errors. Executing both the debugging software routines 128 and normal software routines 126 generally substantially simultaneously consumes additional processing power of processor circuit 102 as compared with executing the normal software routines 126 and either no debug software routines or a subset (e.g., one or more but not all) of the debug software routines (e.g., battery voltage test routines). The extra processing power generally results in an increased power consumption of the mobile telephone apparatus 100.

In the debug mode, the debug software routines 128 executed by the processor circuit 102 generally sends information to the application software 130 in the test computer 124 so that the developer may monitor a behavior of mobile telephone apparatus 100. Once the mobile telephone apparatus-100 is sold to a customer, the debugging software routines 128 may not be used anymore. By disabling the debugging software routines 128 during the normal mode of operation, lower processing resources may be acceptable and thus enable a lower power consumption.

The debugging feature may be controlled by the application software 130 running on the test computer 124. The application software 130 may be responsive to inputs from the developer. The developer may enable the debug software routines 128 at any time to monitor phone behavior. Likewise, the developer may disable the debug software routines 128 at any time to reduce electrical power consumption.

Referring to FIG. 2, a listing of a portion of an example pseudo code 132 implementing a debug software routine 128a embedded in a normal software routine 126a is shown. If the debugging feature is enabled (e.g., the debug mode), a Debug_Function( ) 128a may be activated by a conditional branch instruction 134 reaching a boolean "true" result. In addition, the clock circuit 104 may be controlled to generate the signal CLK at a high frequency (e.g., HIGH_CLOCK at 60 MHz) to account for the additional processing power used to run the activated debugging activities 162.

If the debugging feature is disabled (e.g., the normal node), the Debug_Function( ) 128*a* may be deactivated or bypassed by the conditional branch instruction 134 reaching a boolean "false" result. Furthermore, the clock circuit 104 may be controlled to generate the signal CLK at a low frequency (e.g., LOW_CLOCK at 45 MHz.) Using the lower clock frequency during ordinary telephone operation generally provides power saving to the mobile telephone apparatus 100 without hurting the basic phone functionality. For example, an ARM7/TDMI (Thumb instruction set, Debug interface, Multiplier hardware, fast Interrupts) core processor may consume approximately 1.1 milliwatts (mW) per MHz of operation. An ARM9/TDMI core processor may consume approximately 1.35 mW/MHz. By reducing the clock frequency by 15 MHz, power usage may be reduced approximately 16.5 mW and 20.25 mW, respectively. In contrast, some conventional mobile telephones set the clock frequency to a fixed value for all modes of operation. The debugging capability cannot be disabled even though unused by the consumer after development.

Figure 3:
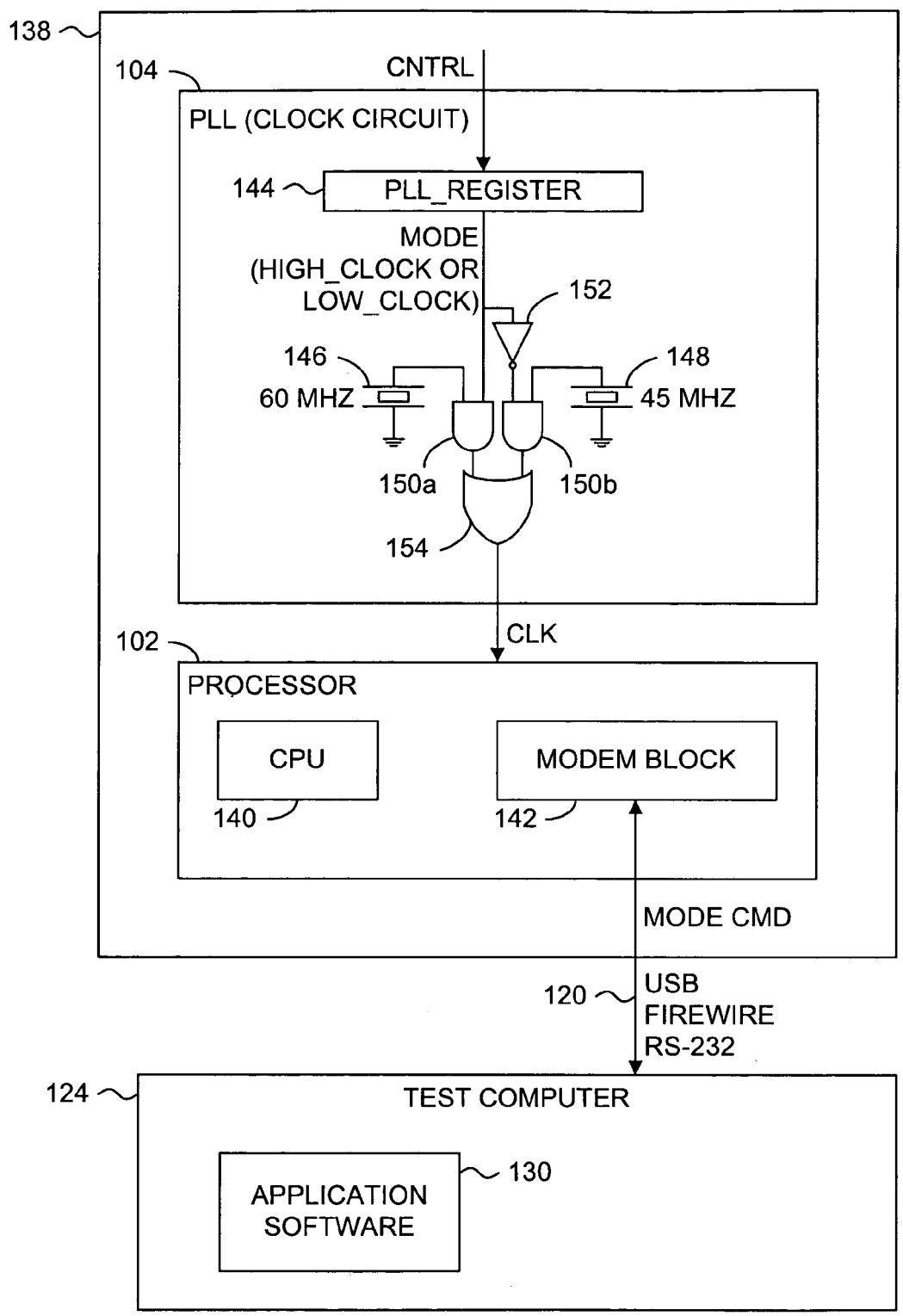
FIG. 3 is a detailed block diagram of an example implementation of a processor circuit and a clock circuit.

Referring to FIG. 3, a detailed block diagram of an example implementation of a circuit 138 generally comprising the processor circuit 102 and the clock circuit 104 is shown. The processor circuit 102 generally comprises a circuit (or block) 140 and a circuit (or block) 142. The circuit 140 may be implemented as a central processor unit (CPU). The CPU 140 may be operational to execute the normal software routines 126 and the debug software routines 128 from the ROM memory 106. The circuit 142 may be referred to as a modem block. The modem block 142 may be operational to communicate with the test computer 124 via the interface 118 and the bus 120. The modem block 142 may be configured to operate from the signal CLK. The modem block 142 may communicate on the bus 120 independently of the frequency of the signal CLK.

The clock circuit 104 generally comprises a register 144, a first crystal 146, a second crystal 148, multiple logic gates 150*a*–150*b*, an inverter 152 and a logic gate 154. The register 144 may receive and store a value (e.g., MODE) conveyed by a control signal (e.g., CNTRL). The value MODE may have a first state (e.g., a logical high state, HIGH_CLOCK) to indicate the debug mode and a second state (e.g., a logical low state, LOW_CLOCK) to indicate the normal node.

The first crystal 146 may be configured to generate the high clock frequency (e.g., 60 MHz) used in the debug mode. The second crystal 148 may be configured to generate the low clock frequency (e.g., 45 MHz) used in the normal node. Other frequencies may be implemented to meet the criteria of a particular application.

The gates 150*a*–150*b* may be implemented as logical AND gates. A first input to the AND gate 150*a* may receive an oscillating signal from the crystal 146. A second input to the AND gate 150*a* may receive the value MODE. A first input to the AND gate 150*b* may receive an oscillating signal from the crystal 148. A second input to the AND gate 150*b* may receive an inverted value of MODE. The inverted value of MODE may be generated by the inverter 152.

An output of each of the AND gates 150*a*-150*b* may be received at a respective input of the gate 154. The gate 154 may be implemented as a logical OR gate. The OR gate 154 may generate the signal CLK.

Referring to both FIGS. 2 and 3, to set the mobile telephone apparatus 100 to the debug mode, the signal MODE CMD may be generated by the application software 130 commanding the debug mode. The signal MODE CMD may be received by the modem block 142 and presented to the CPU 140. When the CPU 140 reads the conditional branch instruction 134, the "Debug_Enabled==TRUE" condition may be satisfied. The CPU 140 may then read an instruction 160 to set the signal CNTRL to the logical high state. The register 144 may store the signal CNTRL and generate the single-bit value MODE in the logical high state. The AND gate 150*a* may receive the logical high state and thus pass the high frequency signal from the crystal 146 to the OR gate 154. The OR gate 154 may generate the clock signal CLK at the high frequency indicating the debug mode. The CPU 140 may execute one or more debugging lines of code 162 at the high clock frequency.

To set the mobile telephone apparatus 100 to the normal mode, the application software 130 may generate the signal MODE CMD commanding the normal mode. The modem block 142 may pass the normal mode command along to the CPU 140. When the CPU 140 executes the conditional branch instruction 134, the "Debug_Enabled==TRUE" condition may be false. Therefore, the CPU 140 may skip executing the debug lines 162. Instead, the CPU 140 may execute an ELSE statement 164 that sets the signal CNTRL to the logical low state at 165. The register 144 may store the signal CNTRL and subsequently generate the value MODE in the logical low state. The inverter 152 may generate the logical high state in response to the value MODE in the logical low state. The AND gate 150*b* may pass the low frequency signal from the crystal 148 to the OR gate 154. The OR gate 154 may generate the clock signal CLK at the low frequency indicating the normal mode.

Figure 4:
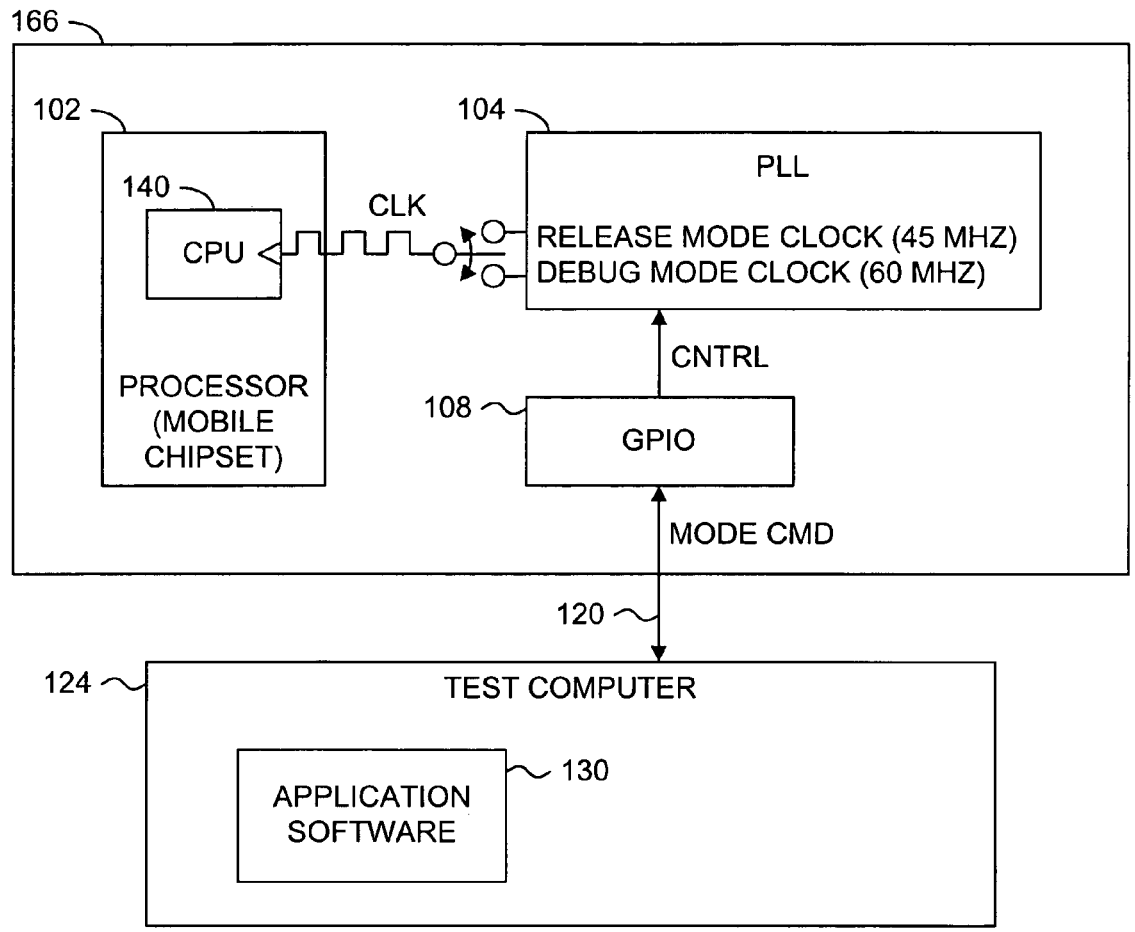
FIG. 4 is a block diagram of an example implementation of a clock circuit controlled by a general purpose input/output circuit.

Referring to FIG. 4, a block diagram of another example implementation of a circuit 166 generally comprising the clock circuit 104 controlled by the GPIO circuit 108 is shown. In the example implementation, the GPIO circuit 108 may be in communication with the application software 130 via the interface 118 and the bus 120. The GPIO circuit 108 may receive the signal MODE CMD from the test computer 124 via the bus 120. The GPIO circuit 108 may generate the signal CNTRL in one of the logical high state or the logical low state, corresponding to the signal MODE CMD. The clock circuit 104 may respond to the signal CNTRL by generating the clock signal CLK at the commanded frequency.

As illustrated by FIGS. 3 and 4, an advantage of the present invention may be to isolate the application software 130 from the mode-controlling circuitry in the mobile telephone apparatus 100. The application software 130 may be coded independently of clock circuit 104 implemented such that the debug mode is entered when the value MODE is in the logical high state. Furthermore, the present invention also allows different circuits (e.g., modem block 142 or GPIO circuit 108) within the mobile telephone apparatus 100 to receive the mode commands. Therefore, the application software 130 may be reusable for different applications.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for conserving power in an apparatus, comprising the steps of:
   (A) disabling a subset of a plurality of debug operations using a clock signal at a first frequency while in a normal mode;
   (B) performing said debug operations using said clock signal at a second frequency while in a debug mode, wherein said first frequency is slower than said second frequency to conserve power; and
   (C) adjusting said clock signal to one of said first frequency and said second frequency in response to receiving a command generated external to said apparatus to transition to a respective one of said normal mode and said debug mode.

2. The method according to claim 1, further comprising the step of:
   performing a plurality of code division multiple access operations while in said debug mode.

3. The method according to claim 1, further comprising the step of:
   writing a single bit to set a frequency of said clock signal as governed by said command.

4. The method according to claim 1, further comprising the step of:
   performing a plurality of code division multiple access operations while in said normal mode.

5. The method according to claim 1, further comprising the step of:
   generating a plurality of debug results by performing said debug operations.

6. The method according to claim 5, further comprising the step of:
   transmitting said debug results out of said apparatus.

7. The method according to claim 1, further comprising the steps of:
   reading a conditional branch instruction; and
   evaluating said conditional branch instruction against said command.

8. The method according to claim 7, further comprising the step of:
   executing at least one of said debug operations in response to said evaluating resulting in a true condition.

9. The method according to claim 1, further comprising the step of:
   driving a processor and a plurality of circuits within said apparatus with said clock signal.

10. The method according to claim 1, further comprising the step of:
    listening for said command while in said normal mode.

11. An apparatus comprising:
    a memory storing a plurality of debug software routines configured to perform a plurality of debug operations;
    a first circuit using a clock signal, coupled to said memory and configured to (i) disable a subset of said debug operations while in a normal mode, (ii) perform said debug operations while in a debug mode and (iii) adjust said clock signal to one of a first frequency corresponding to said normal mode and a second frequency corresponding to said debug mode in response to receiving a command generated from external said apparatus to transition to a respective one of said normal mode and said debug mode, wherein said first frequency is slower than said second frequency to conserve power.

12. The apparatus according to claim 11, further comprising a second circuit configured to generate said clock signal in response to a control signal generated by said first circuit.

13. The apparatus according to claim 12, wherein said second circuit comprises:
    a register configured to store said control signal as a single bit; and
    a third circuit configured to generate said clock signal at a frequency governed by said single bit.

14. The apparatus according to claim 11, wherein said first circuit comprises a processor (i) driven by said clock signal and (ii) configured to execute a plurality of normal software routines stored in said memory and said debug software routines.

15. The apparatus according to claim 14, wherein said processor comprises a communication block configured to communicate on a bus external to said apparatus to receive said command.

16. The apparatus according to claim 15, wherein said communication block is further configured to communicate on said bus while driven by said clock signal at said first frequency and at said second frequency.

17. The apparatus according to claim 11, further comprising a logic circuit driven by said clock signal.

18. The apparatus according to claim 11, further comprising a general purpose input/output circuit configured to communicate on a bus external to said apparatus to receive said command.

19. The apparatus according to claim 11, wherein said first frequency is approximately three-fourths of said second frequency.

20. An apparatus comprising:
    means for disabling a subset of a plurality of debug operations using a clock signal at a first frequency while in a normal mode;
    means for performing said debug operations using said clock signal at a second frequency while in a debug mode, wherein said first frequency is slower than said second frequency to conserve power; and
    means for adjusting said clock signal to one of said first frequency and said second frequency in response to receiving a command generated external to said apparatus to transition to a respective one of said normal mode and said debug mode.

* * * * *